United States Patent
Balakrishnan et al.

(10) Patent No.: US 10,715,679 B1
(45) Date of Patent: Jul. 14, 2020

(54) SYSTEM AND METHOD FOR DETECTING INSTANCES OF MISSING DATA RECORDS IN USAGE DATA RECORDS GENERATED FOR WIRELESS SERVICES

(71) Applicant: Aeris Communications, Inc., Santa Clara, CA (US)

(72) Inventors: Subramanian Balakrishnan, Cupertino, CA (US); Shriman Anupam Bagchi, San Jose, CA (US)

(73) Assignee: Aeris Communications, Inc., San Jose, CA (US)

( * ) Notice: Subject to any disclaimer, the term of this patent is extended or adjusted under 35 U.S.C. 154(b) by 29 days.

(21) Appl. No.: 14/925,902

(22) Filed: Oct. 28, 2015

Related U.S. Application Data

(60) Provisional application No. 62/080,162, filed on Nov. 14, 2014.

(51) Int. Cl.
*H04M 15/00* (2006.01)

(52) U.S. Cl.
CPC ........... *H04M 15/41* (2013.01); *H04M 15/60* (2013.01); *H04M 15/8016* (2013.01); *H04M 15/8214* (2013.01)

(58) Field of Classification Search
CPC ............. H04M 15/41; H04M 15/8214; H04M 15/8016; H04M 15/60
USPC .................................................. 455/406–408
See application file for complete search history.

(56) References Cited

U.S. PATENT DOCUMENTS

| | | | |
|---|---|---|---|
| 6,075,848 A | 6/2000 | Lunn et al. | |
| 6,405,251 B1 | 6/2002 | Bullard et al. | |
| 6,876,731 B2 | 4/2005 | Cerami et al. | |
| 7,272,379 B1 * | 9/2007 | Tang ..................... | H04M 15/00 455/405 |
| 7,769,619 B1 * | 8/2010 | Krysinski .............. | G06Q 10/06 705/7.13 |
| 8,010,081 B1 * | 8/2011 | Roskowski ........... | H04M 15/00 379/114.04 |
| 8,290,471 B1 * | 10/2012 | Jones ................... | H04L 12/1403 379/111 |
| 8,315,365 B2 | 11/2012 | Varadarajan et al. | |
| 8,463,617 B2 * | 6/2013 | Ranous .................. | H04L 29/06 705/1.1 |
| 8,559,607 B2 | 10/2013 | Zoldi et al. | |
| 8,762,359 B2 | 6/2014 | Ertebjerg et al. | |
| 8,908,558 B2 | 12/2014 | Lang et al. | |
| 2012/0084438 A1 * | 4/2012 | Raleigh ................. | H04L 41/046 709/224 |
| 2013/0065551 A1 * | 3/2013 | Raleigh .................. | H04L 63/20 455/405 |
| 2014/0058908 A1 * | 2/2014 | Gupta .................... | G06Q 30/04 705/30 |

(Continued)

*Primary Examiner* — Shahriar Behnamian
(74) *Attorney, Agent, or Firm* — Brundidge & Stanger, P.C.

(57) ABSTRACT

A computer-implemented method and system for detecting instances of missing data records in Usage Data Records (UDRs) generated for wireless services is disclosed. The system and method comprises recording a sequence of events related to transmission of data through at least one service element, transmitting the sequence of events as usage data records to a server for accounting and using an anomaly detection algorithm to detect instances of missing usage data records in the transmitted usage data records.

18 Claims, 9 Drawing Sheets

(56) References Cited

U.S. PATENT DOCUMENTS

| | | |
|---|---|---|
| 2014/0073285 A1 | 3/2014 | Lehane et al. |
| 2014/0075567 A1* | 3/2014 | Raleigh ................. H04W 12/10 |
| | | 726/26 |
| 2014/0289794 A1* | 9/2014 | Raleigh ................... H04L 63/20 |
| | | 726/1 |
| 2015/0044989 A1* | 2/2015 | De Foy .............. H04L 12/1478 |
| | | 455/406 |
| 2015/0072642 A1 | 3/2015 | Raleigh |
| 2015/0304265 A1* | 10/2015 | Vincent ................... H04L 51/32 |
| | | 709/206 |

* cited by examiner

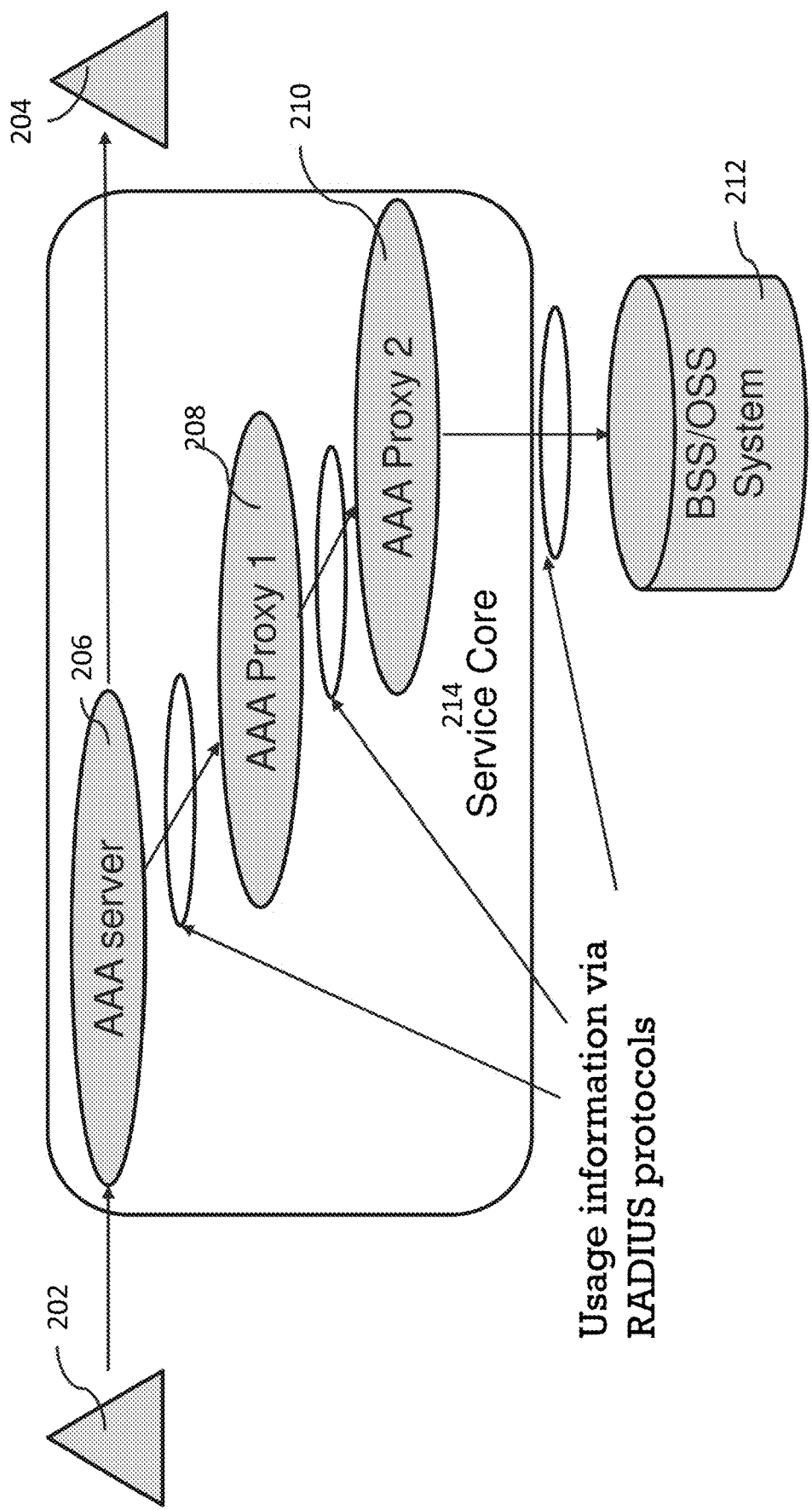

FIG. 3a
302  A normal pattern
304  An abnormal pattern

SYSTEM AND METHOD FOR DETECTING INSTANCES OF MISSING DATA RECORDS IN USAGE DATA RECORDS GENERATED FOR WIRELESS SERVICES

CROSS-REFERENCE TO RELATED APPLICATIONS

Under 35 USC 119(e), this application claims priority to U.S. provisional application Ser. No. 62/080,162, filed on Nov. 14, 2014, which is incorporated herein by reference in its entirety.

FIELD OF THE INVENTION

The present invention relates generally to usage data records, and particularly to detecting instances of missing data records in usage data records generated for wireless services.

BACKGROUND

Devices, whether phones, radios or other types of hardware, that are intended to connect to networks, such as wireless or cellular networks, ordinarily are associated with a user's account and subscription with a network provider. The network provider in turn bills users for the usage of network services based on the amount of data transmitted, location and/or time, typically through the accounting records generated as usage data records (UDRs) associated with the user's account by the network provider. Since these UDRs are used by network providers for billing users for their use of network services, it is important that the UDRs are accurate.

However, the network providers may use network protocols that are fast but unreliable, such as User Datagram Protocol (UDP), to transmit data from a service element to Business Support System/Operational Support System (BSS/OSS) through service element proxies. Since these protocols are not intended to ascertain that the transmitted data is received by the receiver, some of the UDRs may be lost during transmission, and the ability to bill accurately would be compromised.

Accordingly, what is needed is a system and method to address the issue of missing data records due to unreliable or lossy protocols. The present invention addresses such a need.

SUMMARY

A computer-implemented method and system for detecting instances of missing usage data records (UDRs) generated for wireless services is disclosed. The system and method comprises recording a sequence of events related to transmission of data through at least one service element, transmitting the sequence of events as usage data records to a server for accounting and using an anomaly detection algorithm to detect instances of missing usage data records in the transmitted usage data records.

In an embodiment, the anomaly detection algorithm comprises a pattern recognition algorithm for detecting abnormal pattern when a usage data record for only part of the sequence of events is missing where the pattern recognition algorithm detects abnormal pattern when at least one usage data records corresponding to an event in the sequence of events is missing.

In another embodiment, the anomaly detection algorithm comprises a combination of a pattern recognition algorithm and a pattern matching algorithm when usage data records corresponding to the entire sequence of events is missing. The pattern recognition algorithm detects abnormal pattern when at least one usage data records corresponding to an event in the sequence of events is missing and the pattern matching algorithm correlates presence of usage data records corresponding to one or more events as components of data patterns between usage data records generated by multiple service elements, wherein each of the multiple service elements generates usage data records related to the transmission of data independent of the other.

BRIEF DESCRIPTION OF THE DRAWINGS

FIG. 2 illustrates UDR capture mechanism via AAA elements using RADIUS protocol.

FIG. 3a is a diagram illustrating expected normal vs abnormal pattern observed during UDR capture.

DETAILED DESCRIPTION

Figure 1:
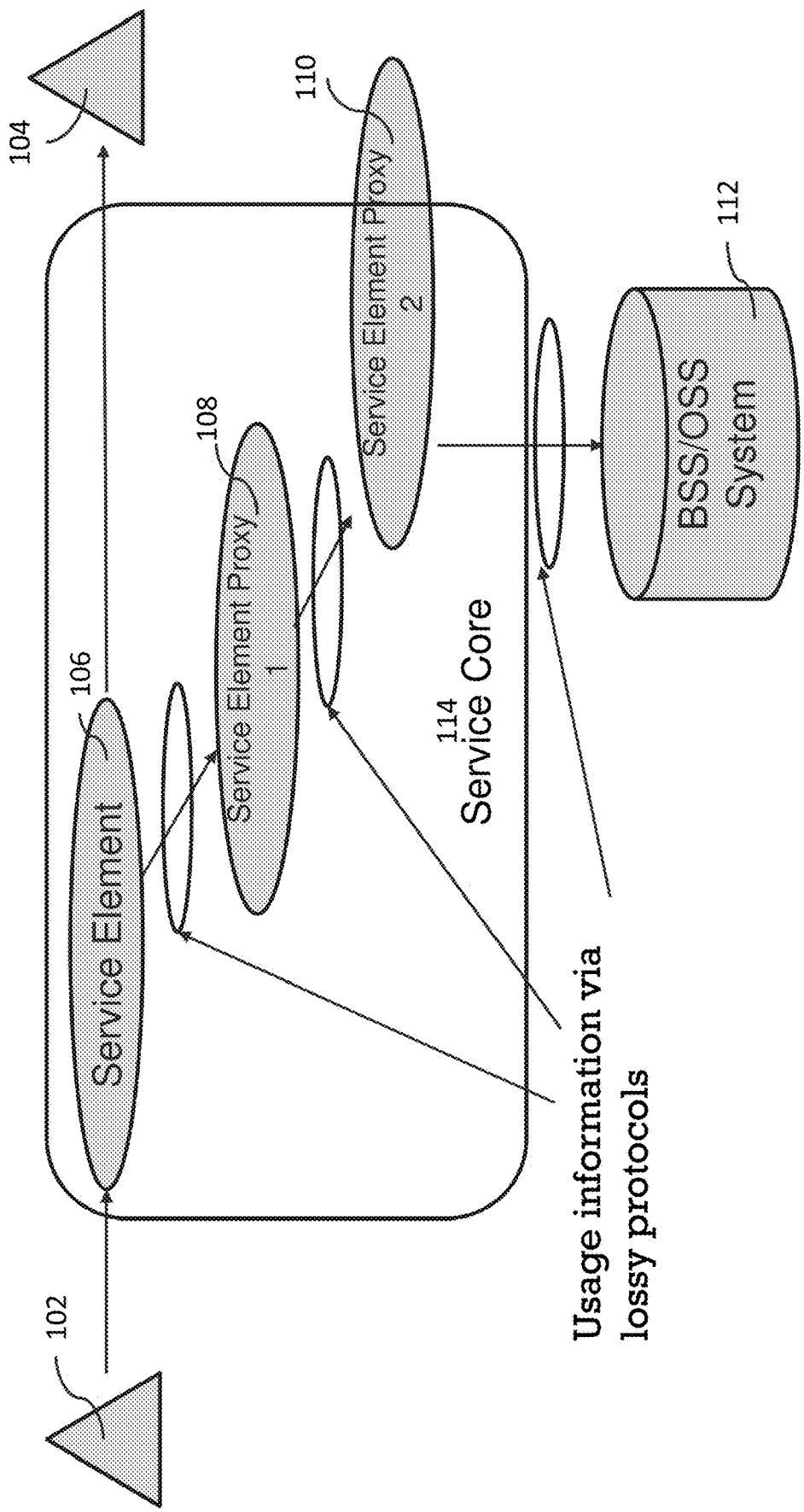
FIG. 1 illustrates an overview of general UDR capture mechanism.

The present invention relates generally to usage data records, and particularly to detecting instances of missing usage data records (UDRs) generated for wireless services.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Devices, whether phones, radios or other types of hardware, that are intended to connect to networks, such as wireless or cellular networks, ordinarily are associated with a user's account and subscription with a network provider. To transmit data over the cellular or other networks, network operators and network providers use service elements such as authentication, authorization and accounting provided through Authentication, Authorization and Accounting (AAA) servers. These service elements authenticate the identity of network devices accessing the network and authorize their access to the network.

Authentication is determined by identification of the network device and its corresponding credentials such as passwords whereas authorization is determined by whether a particular entity is authorized to perform a given activity, typically inherited from authentication when logging on to an application or service. Authorization may be determined based on a range of restrictions; for example, time-of-day restrictions, or physical location restrictions, or restrictions against multiple accesses by the same entity or user. In doing so, they also track consumption of network resources by users in the form of the identity of the user or other entity, the nature of the service delivered, when the service began, and when it ended, and if there is a status to report which is gathered by accounting element and used for capacity and trend analysis, cost allocation and billing.

The network provider in turn bills users for the usage of network services based on the amount of data transmitted, location and/or time, typically through the accounting records generated as usage data records (UDRs) associated with the user's account by the network provider. The UDRs generally contain information required for billing, for example, start and stop time of the data transmission, amount of data transmitted, location, time of the day, day of the week. The UDRs are generated by AAA servers and are transmitted through AAA proxies to Business Support System/Operational Support System (BSS/OSS) for billing. Since these UDRs are used by network providers for billing users for their use of network services, it is important that the UDRs are accurate.

Several different types of protocols are currently available for data transmission providing different advantages such as high speed, reliability etc. Generally, the selection of appropriate protocols involves a tradeoff, as speed and reliability usually vary inversely, such that when the speed of data transmission is high, the reliability of data transmission is low, and vice versa. When the network is to be optimized for reliability, then data transmission protocols such as Transmission Control Protocol (TCP) are used, and orders for and delivery of data packets are error-checked, with the result that the transmission of data is reliable with a negligible loss of data records. TCP, as an example, uses processes to confirm the receipt of data through retry attempts. However, using protocols that optimize for reliability can have some practical disadvantages, such as lower speed of data transmission or, if frequent retry attempts are made to confirm delivery and those retry attempts result in network congestion, an effective Denial Of Service (DOS) situation.

Network providers may choose to trade reliability for a reduction in the time and energy spent capturing proof that the network service was provided by using data transmission protocols that are optimized for lower latency, for example, User Datagram Protocol (UDP). However, since these protocols are not intended to ascertain that the transmitted data is in fact received by the receiver, then some of the UDRs may be lost, and the ability to bill accurately, which relies on data such as start time of the data transmission session or stop time of the data transmission session and the amount of data transmitted during the session, would be compromised, and important data relating to network service, such as location, time of the day, day of the week, could be lost. This can lead to revenue loss, since the failure of some UDRs to reach the BSS/OSS system used for billing means that the usage documented by those UDRs cannot be billed to the customers.

Accordingly, what is needed is a system and method to address the issue of missing data records due to unreliable or lossy protocols. The present invention addresses such a need.

Although a system and method in accordance with the present invention is described with respect to data transmission via protocols optimized for speed of delivery of data such as UDP, as used herein the term "unreliable protocol" is intended to be inclusive, interchangeable, and/or synonymous with other similar protocols that optimize for performance features other than confirming delivery which may result in loss of usage data records. Furthermore as described further below, though one will recognize that functionally different types of protocols may have characteristics, functions and/or operations which may be specific to their individual capabilities and/or deployment.

Network providers often prefer using network protocols for data transmission that lower network latency by giving up reliability to meet response time needs for requested service elements. A service element may be a network element that provides a service to the end users. The service element may include the RADIUS AAA server, or another entity (e.g., Diameter credit-control client). Examples of the service elements include Network Access Server (NAS), Session Initiation Protocol (SIP) Proxy, and application servers such as messaging server, content server, and gaming server. A service event is an event relating to a service provided to the end user which is recorded by the service elements as a UDR. This UDR is then sent to service element store and forward proxies and finally to a BSS/OSS system to be used for billing end users for the services used and for analytics.

Network providers may use unreliable network protocols to transmit data from a service element to service element store and forward proxies to BSS/OSS. Since these protocols are not intended to ascertain that the transmitted data is received by the receiver, then the loss of some of the UDRs would not be detected, and the ability to bill accurately may be compromised. The ability to bill accurately relies on data such as but not limited to start time of the data transmission or stop time of the data transmission and values associated with these records, for example, amount of data transmitted, location, time of the day, and day of the week.

One such example is a RADIUS protocol that uses UDP instead of TCP for data transfer between AAA proxies. The performance of unreliable network protocols depends on, among other parameters, the load on the receiving server at the time of data transmission. For example, if the RADIUS proxy server is busy or resource constrained at the time of transmission, it may not reliably process all incoming UDP-based UDR data, resulting in the failure of the proxy server to deliver all UDRs given to it. One way of addressing this issue is to use more reliable network protocols such as TCP, but this will increase the response time of request service elements. Another way of addressing this issue is by increasing the number or capacity of the receiving servers used as a data receptacle, which increases equipment costs.

The present invention provides a cost-effective approach without compromising the response time by using a system and method comprising capturing the level of information loss, providing metrics to help assess the level of data loss, providing an early warning system by generating alerts and KPI reports for network providers and escalating an action to the warning that would allow the network providers to address the constraints and issues of the store and forward service element proxies and to devise other possible sources for UDR. This is achieved by anomaly detection using pattern recognition and pattern matching algorithms in the recorded patterns for the transmission of data through AAA servers.

To describe the features of the present invention in more detail refer to the accompanying figures in conjunction with the following discussions. These examples are used for purpose of illustration only, and should not be construed as limitations.

FIG. 1 illustrates an overview of a general Usage Data Record (UDR) capture mechanism. As a sender 102 sends data over the network to a receiver 104, the data is transmitted through service elements 106 such as an AAA server or a Network Access Server (NAS) which is part of a service core 114. The service elements 106 capture the usage information needed for BSS/OSS 112 to bill users based on the services used. The service elements 106 forward the UDR data between store and forward proxies which are also part of the service core 114, for example, service element proxy 1 108 to service element proxy 2 110, until it reaches the BSS/OSS system 112. The BSS/OSS system 112 uses the UDR data containing usage information to provide services such as billing and analytics. However, when the network provider uses unreliable protocols to transmit the UDR data between the service elements 106 to service element proxy 1 108, service element proxy 2 110 and finally to BSS/OSS 112, some data containing UDRs may fail to be transmitted and their loss not detected due to unreliability of the protocols used for such transmission. Example of such a flow is AAA network elements using RADIUS or DIAMETER protocols to forward the UDRs to a BSS/OSS system as shown in FIG. 2.

FIG. 2 illustrates UDR capture mechanism via AAA elements using RADIUS protocol. As a sender 202 sends data over the network to a receiver 204, the data is transmitted through an AAA server 206 which is part of a service core 214. The AAA server 206 captures the usage information needed for BSS/OSS 212. The AAA server 206 forwards the data between store and forward proxies which are also part of the service core 214, for example, AAA proxy 1 208 and AAA proxy 2 210 until it reaches the BSS/OSS system 212. The BSS/OSS system 212 uses the UDRs containing usage information to provide services such as billing and analytics. However, when the network provider uses unreliable protocols to transmit the UDR data between the AAA server 206 to AAA proxy 1 208, AAA proxy 2 210 and finally to the BSS/OSS 212, some data containing UDRs may fail to be transmitted and their loss not detected due to unreliability of the protocols used for such transmission. Therefore, not all the data that is transmitted by the AAA server 206 may reach the BSS/OSS system 212. Since this transmitted data in the form of UDRs is used by the BSS/OSS system 212 for billing purposes, such lost data results in loss of revenue.

FIG. 3a is a diagram illustrating expected normal vs abnormal pattern of data transmission observed during UDR capture. The missing UDR can be identified using pattern recognition of the stream of data flowing between service elements and BSS/OSS systems. The missing link in the expected or normal patterns and/or irregular patterns of data flow between the service elements and the BSS/OSS system will indicate UDR loss. As shown in FIG. 3, service elements using RADIUS protocols with UDP network protocol for AAA accounting, will have a normal pattern 302 of One START record followed by 0 . . . n CONTINUE records at regular intervals with one STOP record. An abnormal pattern 304 as shown includes a missing STOP record. However, the abnormal pattern may also include a missing START record and/or one or more missing CONTINUE records.

Figure 3B:
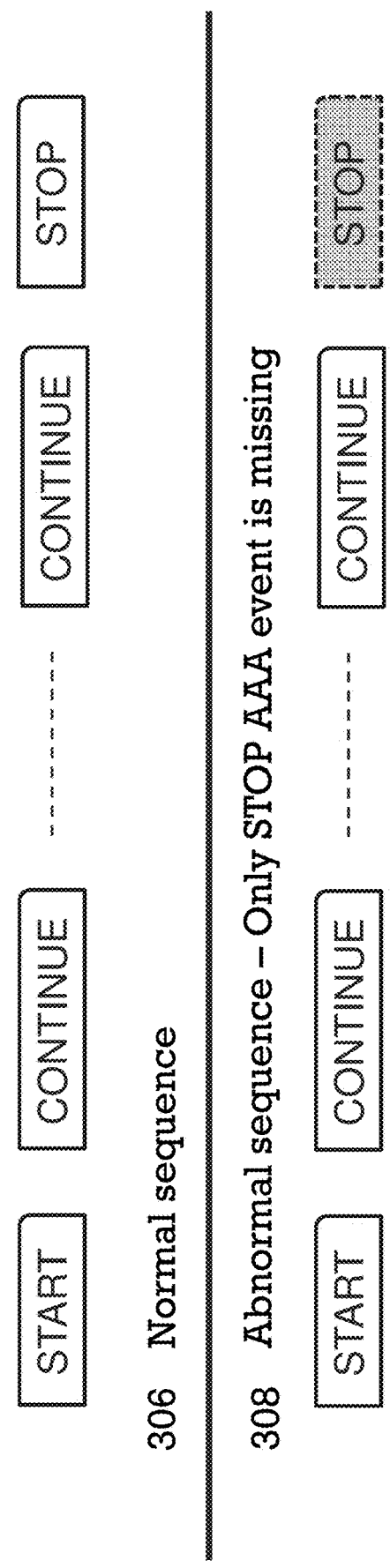
FIG. 3b is a diagram illustrating normal vs abnormal pattern observed during UDR capture via AAA elements.

FIG. 3b is a diagram illustrating normal vs abnormal pattern observed during UDR capture via AAA elements. Here the STOP record is missing in abnormal pattern 308; therefore, BSS/OSS will not be able to use this UDR for billing. Since the last part of the transmission of data which is a STOP record in the UDR never reaches the BSS/OSS, the usage during that data session is never billed to the customers, leading to loss of revenue for the network service provider. Although the missing data as shown in FIG. 3b is the STOP record, the use of unreliable protocol may result in missing data containing a START record or one or more CONTINUE records.

Alternatively, the entire record sequence (START-CONTINUE-STOP) may be dropped during the transmission. The anomaly detection algorithm used to detect instances of missing data records uses pattern recognition when only part of the data record sequence is missing, and uses a combination of pattern recognition and pattern matching when the entire data record sequence is missing. These different approaches are described in detail with the help of FIGS. 4, 5 and 6 below.

Figure 4:
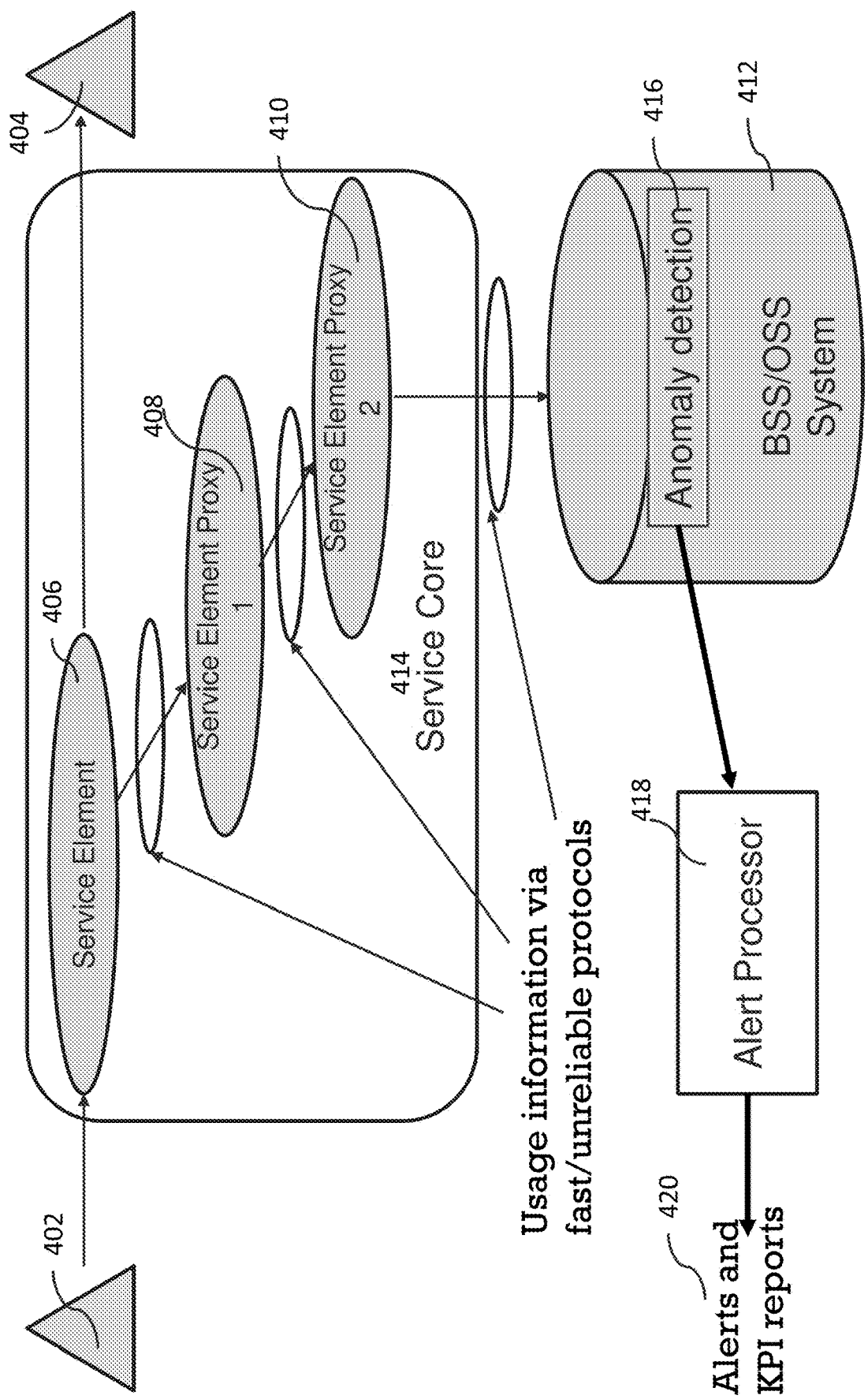
FIG. 4 is a diagram illustrating detection of instances of missing data records during UDR capture via AAA elements in accordance with an embodiment.

FIG. 4 is a diagram illustrating detection of instances of missing data records during UDR capture via service elements in accordance with a first embodiment. As a sender 402 sends data over the network to a receiver 404, the data is transmitted through an AAA server 406 which is part of a service core 414. The AAA server 406 captures the usage information needed for BSS/OSS 412. The AAA server 406 forwards the data between store and forward proxies which are also part of the service core 414, for example, AAA proxy 1 408 and AAA proxy 2 410 until it reaches the BSS/OSS system 412. The BSS/OSS system 412 uses the UDRs containing usage information to provide services such as billing and analytics. However, not all the data that is transmitted by the AAA server 406 may reach the BSS/OSS system 412 due to various issues, such as congestion of network resources, and the loss of those records would not be detected due to the unreliability of the protocol used for such transmission. The anomaly detection 416 uses pattern recognition algorithm to identify missing UDRs and issue alerts and KPI reports 420 generated by alert processor 418. In this embodiment, the missing instances can be identified only when at least some part of the data transmission record sequence is present.

Figure 5:
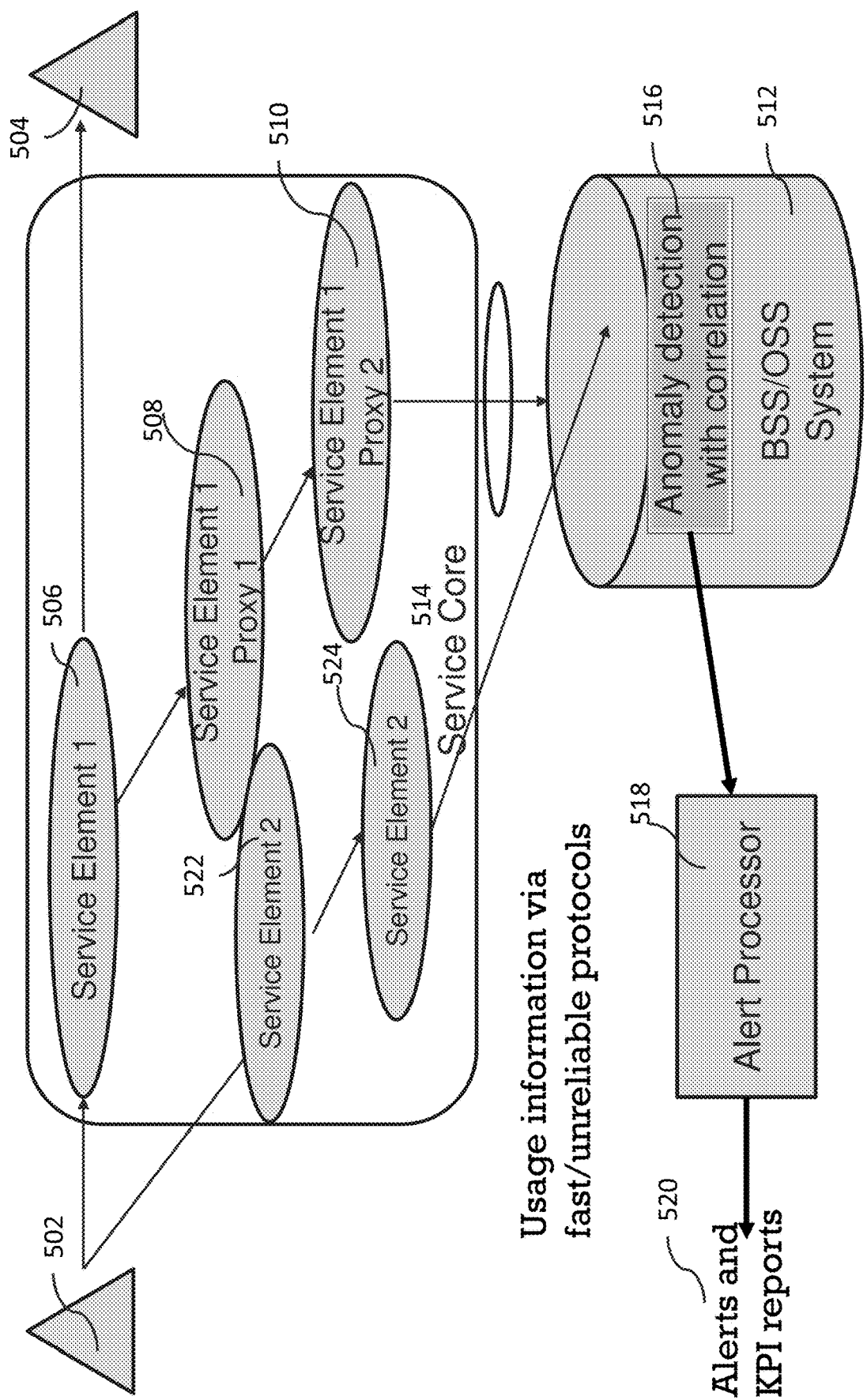
FIG. 5 is a diagram illustrating detection of instances of missing data records during UDR capture via AAA elements in accordance with second embodiment.

FIG. 5 is a diagram illustrating detection of instances of missing data records during UDR capture via AAA elements in accordance with second embodiment. As a sender 502 sends data over the network to a receiver 504, the data is transmitted through an AAA server 506 which is part of a service core 514. The AAA server 506 captures the usage information needed for BSS/OSS 512. The AAA server 506 forwards the data between store and forward proxies which are also part of the service core 514, for example, AAA proxy 1 508 and AAA proxy 2 510 until it reaches the BSS/OSS system 512. The BSS/OSS system 512 uses the UDRs containing usage information to provide services such as billing and analytics. However, not all the data that is transmitted by the AAA server 506 may reach the BSS/OSS system 512 due to various issues, such as congestion of network resources, and the loss of those records would not be detected due to the unreliability of the protocol used for such transmission.

In this embodiment, even if a whole tuple set consisting of the entire sequence including one START record followed by 0 ... n CONTINUE records and one STOP record is missing, the missing UDR can be identified by correlating data records from multiple service elements. The anomaly detection with correlation 516 uses pattern recognition and pattern matching algorithms to identify missing UDRs by correlating presence of data patterns and components of data patterns between different service elements and issue alerts and KPI reports 520 generated by alert processor 518. For example, data records missing in service element 1 proxy are derived by looking into corresponding data records generated by service elements 2 522 and 524. The use of multiple service elements that independently generate or capture data relating to network activity, whether the service elements use fast but unreliable network protocol for data transmission or slow but reliable network protocol, enables identification of missing data when a given service element is missing a whole tuple set. Although the data report generated by service element 2 522 and 524 may not transmit data records containing all the information relevant to billing such as location, time of the day, day of the week, it may still give an insight into the missing data reports where no traces of data transmission are found in service elements that use faster network protocols.

In an embodiment, both network protocols may be fast and unreliable, in which case the level of confidence for detection of missing UDRs may be low, or one network protocol may be fast and unreliable while the other may be slow but reliable, in which case the level of confidence for detection of missing UDRs may be high. Data records in the data report generated by HA using one network protocol or service element, for example, service element 1 AAA, when compared with the data records in the data report generated by HA either using another independent service element, for example, service element 2, or by using another network protocol, via pattern matching enables identification of missing data records when a given service element is missing a whole tuple set. Service element 2 may include servers such as but not limited to Network Access Server (NAS), Session Initiation Protocol (SIP) Proxy, and application servers such as messaging server, content server, and gaming server etc.

Figure 6:
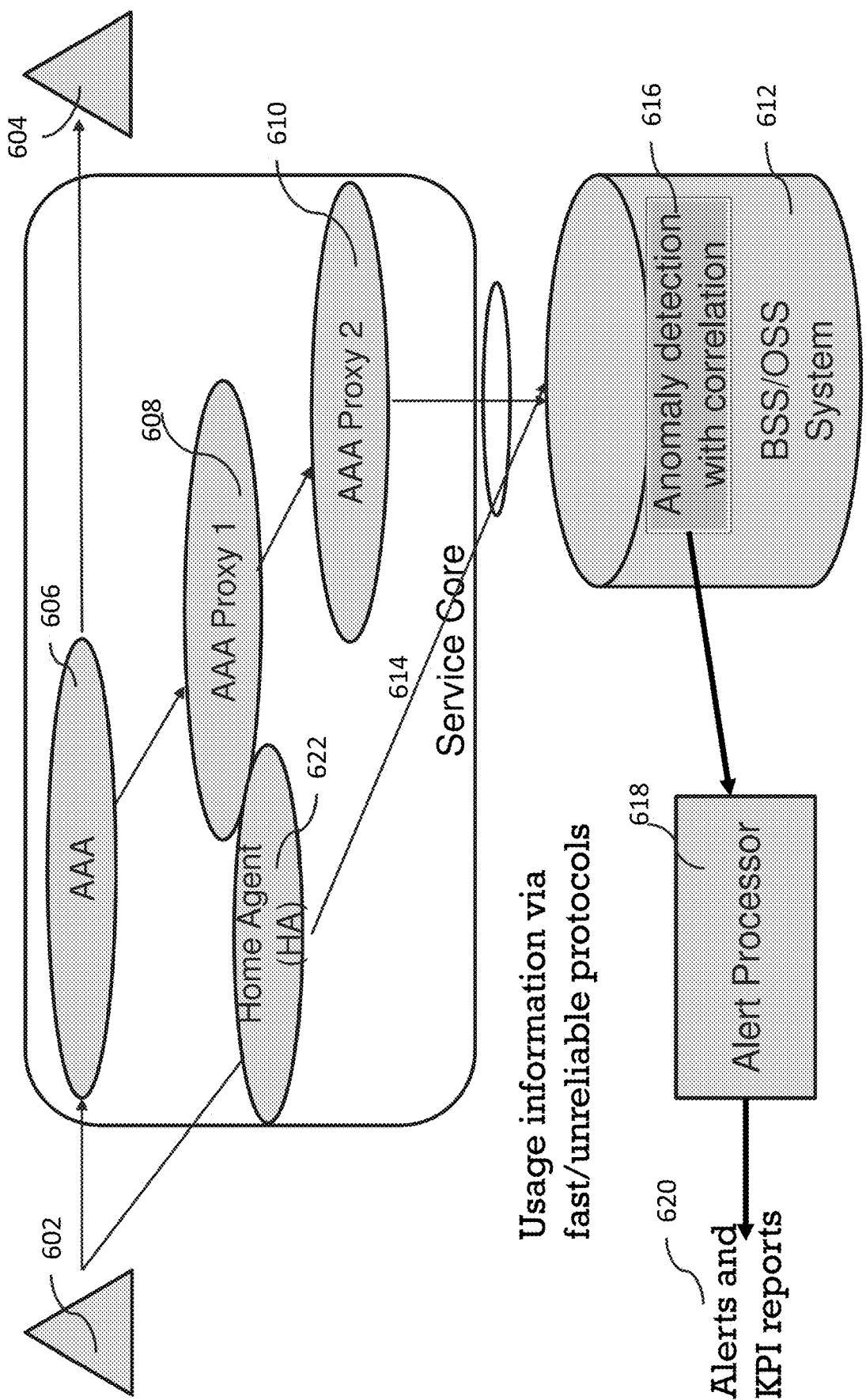
FIG. 6 is a diagram illustrating detection of instances of missing data records during UDR capture via AAA elements in accordance with third embodiment.

FIG. 6 is a diagram illustrating detection of instances of missing data records during UDR capture via AAA elements in accordance with third embodiment. As a sender 602 sends data over the network to a receiver 604, the data is transmitted through an AAA server 606 which is part of a service core 614. The AAA server 606 captures the usage information needed for BSS/OSS 612. The AAA server 606 forwards the data between proxies which are also part of the service core 614, for example, AAA proxy 1 608 and AAA proxy 2 610 until it reaches the BSS/OSS system 612. The BSS/OSS system 612 uses the UDRs containing usage information to provide services such as billing and analytics. However, not all the data that is transmitted by the AAA server 606 may reach the BSS/OSS system 612 due to various issues, such as congestion of network resources, and the loss of those records would not be detected due to the unreliability of the protocol used for such transmission.

In this embodiment, even if a whole tuple set is missing from one service element, it can be identified by correlating data from multiple service elements. The anomaly detection with correlation 616 uses pattern recognition and pattern matching algorithms to identify missing UDRs by correlating presence of data patterns and components of data patterns between different service elements and issue alerts and KPI reports 620 generated by alert processor 618. For example, data reports missing in service element 1 proxy 608, 610 are derived by looking into data reports generated by another service element such as Home Agent (HA) 622, which is an AAA server in the home network of the roaming device. The HA also stores user profile information, responds to authentication requests and collects accounting information. The use of multiple service elements that independently generate or capture data relating to network activity, whether the service elements use fast but unreliable network protocol for data transmission or slow but reliable network protocol, enables identification of missing data when a given service element is missing a whole tuple set. Although the data report generated by the HA 622 may not have all the information relevant to billing such as location, time of the day, day of the week, it may still give an insight into the missing data reports where no traces of data transmission are found in the other service element(s) that use faster but unreliable network protocols.

In an embodiment, both network protocols may be fast and unreliable, in which case the level of confidence or detection of missing UDRs may be low, or one network protocol may be fast and unreliable while the other may be slow but reliable, in which case the level of confidence or detection of missing UDRs may be high. Data records in the data report generated by HA using one network protocol when compared with data records in the data report generated by HA using another network protocol via pattern matching enables identification of missing data records when a given service element is missing a whole tuple set.

Figure 7:
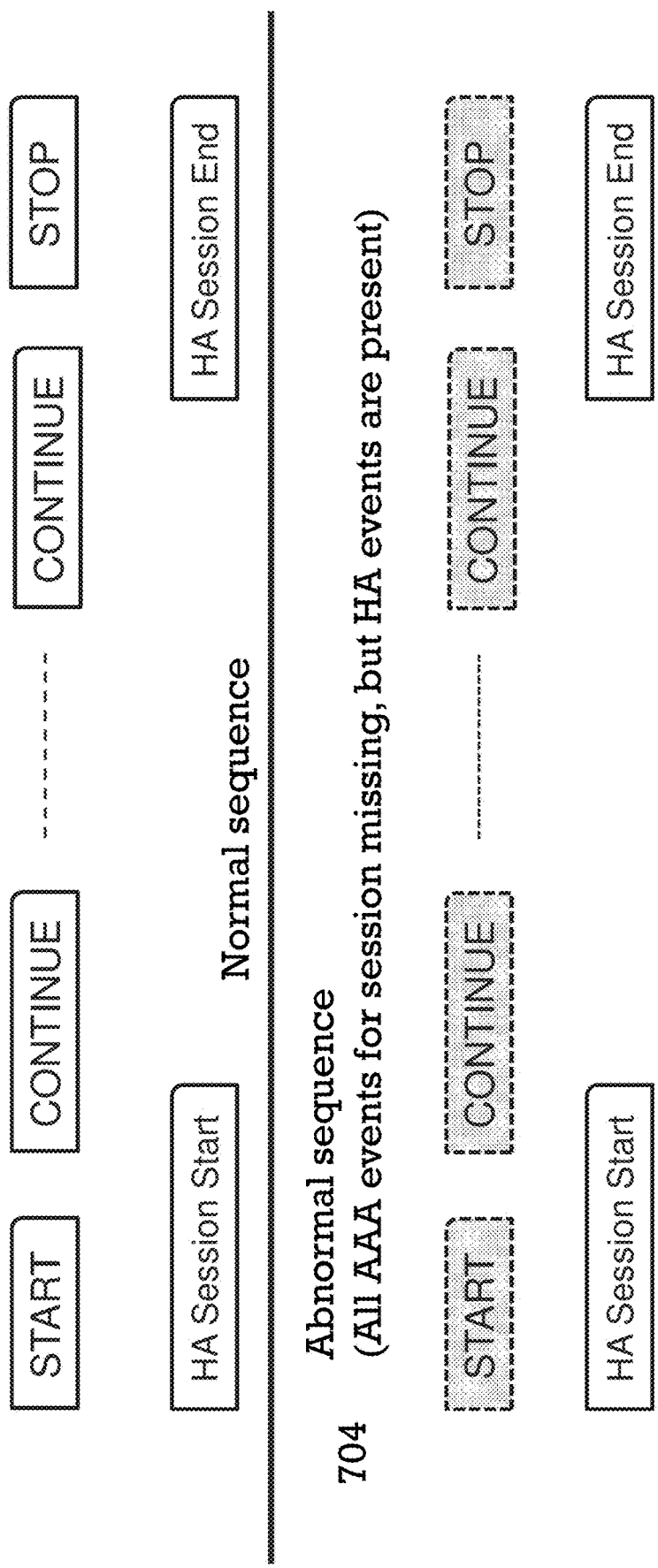
FIG. 7 is a diagram illustrating a pattern recognition method as used for detection of instances of missing data records during UDR capture via AAA elements in accordance with the third embodiment.

FIG. 7 is a diagram illustrating a pattern recognition method as used for detection of instances of missing data records during UDR capture via AAA elements in accordance with the third embodiment. Here the pattern to identify missing UDR is achieved via correlation of data from multiple Service Elements. For example, data records missing in AAA Accounting proxy are derived by looking into the data records transmitted through HA. As shown in FIG. 7, a normal sequence 702 begins with a START record in the AAA proxy and corresponds to a HA session start record as recorded by the HA and ends with a STOP record in the AAA proxy and corresponds to a HA session end record as recorded by the HA. In an abnormal sequence 704, even when all the data records including START, CONTINUE and STOP records for a particular data transmission session are missing from AAA proxy, the detection of missing records is possible because of the records independently generated by the HA as HA session start record and HA session end record. This approach thus enables identification of missing data even when a given service element is missing a whole tuple set.

Figure 8:
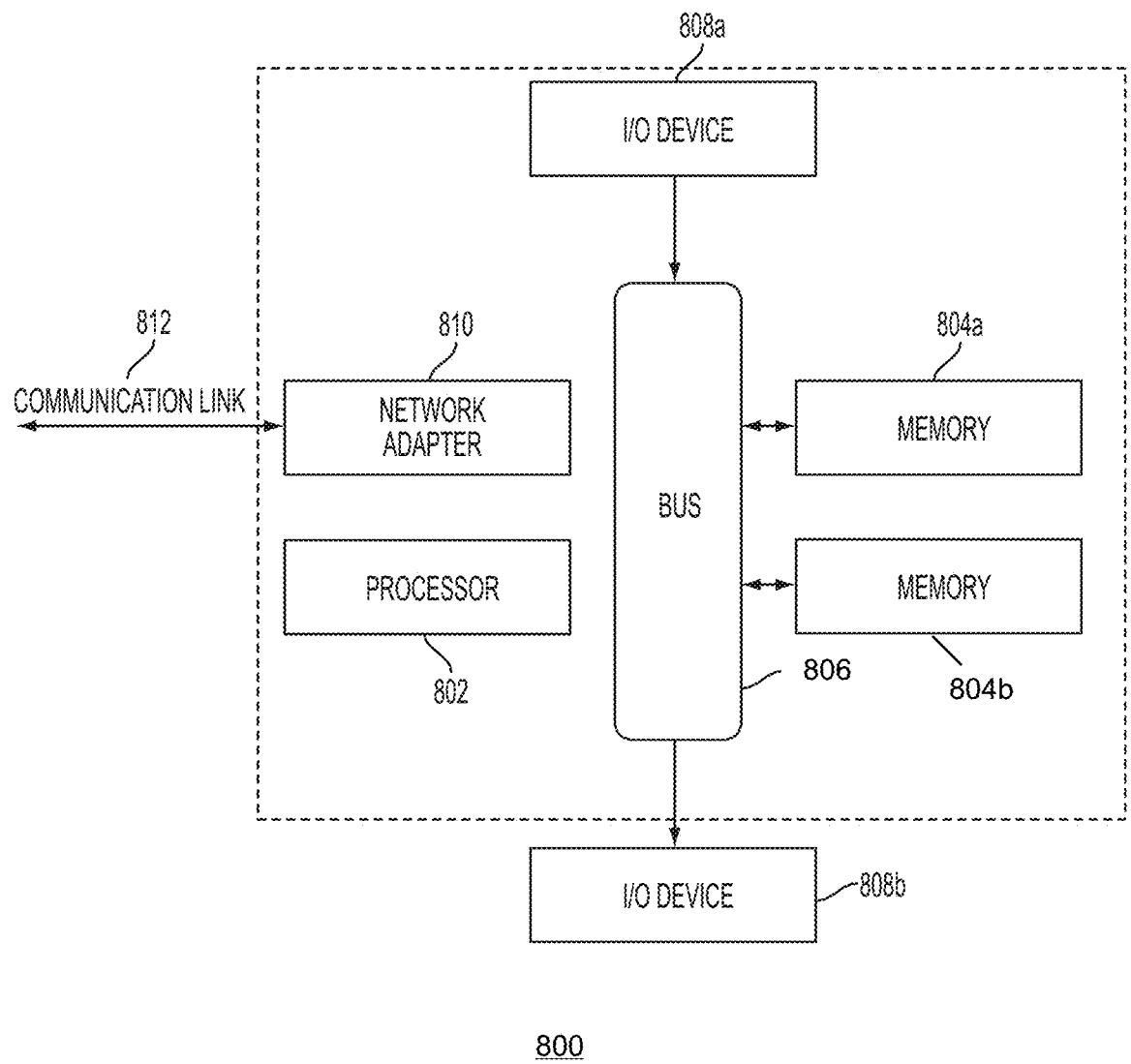
FIG. 8 illustrates a data processing system 800 suitable for storing the computer program product and/or executing program code relating to the choices of the users in accordance with an embodiment of the present invention.

FIG. 8 illustrates a data processing system 800 suitable for storing the computer program product and/or executing program code in accordance with an embodiment of the present invention. The data processing system 800 includes a processor 802 coupled to memory elements 804a-b through a system bus 806. In other embodiments, the data processing system 800 may include more than one processor and each processor may be coupled directly or indirectly to one or more memory elements through a system bus.

Memory elements 804a-b can include local memory employed during actual execution of the program code, bulk storage, and cache memories that provide temporary storage of at least some program code in order to reduce the number of times the code must be retrieved from bulk storage during execution. As shown, input/output or I/O devices 808a-b (including, but not limited to, keyboards, displays, pointing devices, etc.) are coupled to the data processing system 800.

I/O devices 808*a-b* may be coupled to the data processing system 800 directly or indirectly through intervening I/O controllers (not shown).

In FIG. 8, a network adapter 810 is coupled to the data processing system 802 to enable data processing system 802 to become coupled to other data processing systems or remote printers or storage devices through communication link 812. Communication link 812 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a M2M but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method comprising:
    recording a sequence of events related to transmission of data through at least one service element;
    transmitting the sequence of events recorded by the at least one service element as usage data records from the at least one service element to a server for accounting, wherein the usage data records for the sequence of events without missing records comprises one START record followed by a number of CONTINUE records at regular intervals and one STOP record, wherein the number of CONTINUE records is any number from 0 to n; and
    using an anomaly detection algorithm to detect instances of missing usage data records lost during transmission of the usage data records from the at least one service element to the server for accounting,
    wherein the instances of missing usage data records comprise any of at least one usage data record corresponding to an event in the sequence of events is missing, usage data records corresponding to the entire sequence of events is missing or a combination thereof, and
    wherein the anomaly detection algorithm comprises any of:
        pattern recognition algorithm when a usage data record corresponding to an event in the sequence of events in the recorded pattern of transmission of data through the at least one service element is missing, and
        a pattern matching algorithm using the recorded pattern of the transmission of data through the at least one service element when usage data records corresponding to the entire sequence of events in the recorded pattern of transmission of data through the at least one service element is missing.

2. The computer-implemented method of claim 1, wherein the usage data record further comprises any of start time of the data transmission session, stop time of the data transmission session, amount of data transmitted, data relating to network service such as location, time of the day, day of the week and a combination thereof.

3. The computer-implemented method of claim 1, wherein the pattern recognition algorithm further comprises detecting an abnormal pattern wherein at least one usage data records corresponding to an event in the sequence of events is missing.

4. The computer-implemented method of claim 1, wherein the anomaly detection algorithm comprises a combination of the pattern recognition algorithm and the pattern matching algorithm when usage data records corresponding to the entire sequence of events is missing;

wherein the pattern recognition algorithm further comprises detecting an abnormal pattern wherein at least one usage data record corresponding to an event in the sequence of events is missing; and wherein the pattern matching algorithm further comprises correlating presence of usage data records corresponding to one or more events as components of data patterns between usage data records generated by multiple service elements, wherein each of the multiple service elements generates usage data records related to the transmission of data independent of the other.

5. The computer-implemented method of claim 1 further comprising:

providing metrics to assess the level of data loss; and escalating an action providing an early warning system.

6. The computer-implemented method of claim 5 wherein the early warning system comprises generating alerts and Key Performance Indicator reports for network providers.

7. A computer-implemented system for detecting instances of missing data records in usage data records comprising:

a processor, and a memory in communication with the processor wherein the memory containing program instructions which when executed by the processor, perform the following operations comprising:

recording a sequence of events related to transmission of data through at least one service element;

transmitting the sequence of events recorded by the at least one service element as usage data records from the at least one service element to a server for accounting, wherein the usage data records for the sequence of events without missing records comprises one START record followed by a number of CONTINUE records at regular intervals and one STOP record, wherein the number of CONTINUE records is any number from 0 to n; and using an anomaly detection algorithm to detect instances of missing usage data records lost during transmission of the usage data records from the at least one service element to the server for accounting, wherein the instances of missing usage data records comprise any of at least one usage data record corresponding to an event in the sequence of events is missing, usage data records corresponding to the entire sequence of events is missing or a combination thereof, and wherein the anomaly detection algorithm comprises any of:

pattern recognition algorithm when a usage data record corresponding to an event in the sequence of events in the recorded pattern of transmission of data through the at least one service element is missing, and a pattern matching algorithm using the recorded pattern of transmission of data through the at least one service element when usage data records corresponding to the entire sequence of events in the recorded pattern of transmission of data through the at least one service element is missing.

8. The computer-implemented system of claim 7, wherein the usage data record further comprises any of start time of the data transmission session, stop time of the data transmission session, amount of data transmitted, data relating to network service such as location, time of the day, day of the week and a combination thereof.

9. The computer-implemented system of claim 7, wherein the pattern recognition algorithm further comprises detecting an abnormal pattern wherein at least one usage data records corresponding to an event in the sequence of events is missing.

10. The computer-implemented system of claim 7, wherein the anomaly detection algorithm comprises a combination of the pattern recognition algorithm and the pattern matching algorithm when usage data records corresponding to the entire sequence of events is missing;

wherein the pattern recognition algorithm further comprises detecting an abnormal pattern wherein at least one usage data records corresponding to an event in the sequence of events is missing; and wherein the pattern matching algorithm further comprises correlating presence of usage data records corresponding to one or more events as components of data patterns between usage data records generated by multiple service elements, wherein each of the multiple service elements generates usage data records related to the transmission of data independent of the other.

11. The computer-implemented method of claim 7 further comprising:

providing metrics to assess the level of data loss; and escalating an action providing an early warning system.

12. The computer-implemented method of claim 11 wherein the early warning system comprises generating alerts and Key Performance Indicator reports for network providers.

13. A computer program product stored on a non-transitory computer readable medium for detecting instances of missing data records in usage data records, comprising computer readable programming for causing a computer to control execution of an application for detecting instances of missing data records in usage data records comprising:

recording a sequence of events related to transmission of data through at least one service element;

transmitting the sequence of events recorded by the at least one service element as usage data records from the at least one service element to a server for accounting, wherein the usage data records for the sequence of events without missing records comprises one START record followed by a number of CONTINUE records at regular intervals and one STOP record, wherein the number of CONTINUE records is any number from 0 to n; and using an anomaly detection algorithm to detect instances of missing usage data records lost during transmission of the usage data records from the at least one service element to the server for accounting, wherein the instances of missing usage data records comprise any of at least one usage data record corresponding to an event in the sequence of events is missing, usage data records corresponding to the entire sequence of events is missing or a combination thereof, and wherein the anomaly detection algorithm comprises any of:

pattern recognition algorithm when a usage data record corresponding to an event in the recorded pattern of transmission of data through the at least one service element in the sequence of events is missing, and a pattern matching algorithm using the recorded pattern of the transmission of data through the at least one service element when usage data records corresponding to the entire sequence of events in the recorded pattern of transmission of data through the at least one service element is missing.

14. The computer program product of claim 13, wherein the usage data record further comprises any of start time of the data transmission session, stop time of the data transmission session, amount of data transmitted, data relating to network service such as location, time of the day, day of the week and a combination thereof.

15. The computer program product of claim 13,
wherein the pattern recognition algorithm further comprises detecting an abnormal pattern wherein at least one usage data records corresponding to an event in the sequence of events is missing.

16. The computer program product of claim 13,
wherein the anomaly detection algorithm comprises a combination of the pattern recognition algorithm and the pattern matching algorithm when usage data records corresponding to the entire sequence of events is missing;
wherein the pattern recognition algorithm further comprises detecting an abnormal pattern wherein at least one usage data records corresponding to an event in the sequence of events is missing; and
wherein the pattern matching algorithm further comprises correlating presence of usage data records corresponding to one or more events as components of data patterns between usage data records generated by multiple service elements, wherein each of the multiple service elements generates usage data records related to the transmission of data independent of the other.

17. The computer program product of claim 13 further comprising:
providing metrics to assess the level of data loss; and
escalating an action providing an early warning system.

18. The computer program product of claim 17 wherein the early warning system comprises generating alerts and Key Performance Indicator reports for network providers.

\* \* \* \* \*